(12) United States Patent
Liu et al.

(10) Patent No.: US 12,224,955 B2
(45) Date of Patent: Feb. 11, 2025

(54) REFERENCE SIGNAL SENDING METHOD AND TRANSMITTER

(71) Applicant: VIVO MOBILE COMMUNICATION CO., LTD., Dongguan (CN)

(72) Inventors: Hao Liu, Dongguan (CN); Peng Sun, Dongguan (CN); Yang Song, Dongguan (CN); Rakesh Tamrakar, Dongguan (CN); Kaili Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 334 days.

(21) Appl. No.: 17/751,641

(22) Filed: May 23, 2022

(65) Prior Publication Data
US 2022/0286252 A1    Sep. 8, 2022

Related U.S. Application Data

(63) Continuation of application No. PCT/CN2020/132631, filed on Nov. 30, 2020.

(30) Foreign Application Priority Data

Dec. 5, 2019 (CN) .......................... 201911236416.2

(51) Int. Cl.
*H04B 17/345* (2015.01)
*H04L 5/00* (2006.01)
(52) U.S. Cl.
CPC ......... *H04L 5/0048* (2013.01); *H04B 17/345* (2015.01)
(58) Field of Classification Search
CPC ...... H04B 1/04; H04B 17/101; H04B 17/345; H04L 27/261; H04L 5/0007; H04L 5/0048; H04L 5/0051; H04L 5/0073; H04L 1/0068; H04W 24/08; H04W 52/0216; H04W 52/0238
See application file for complete search history.

(56) References Cited

U.S. PATENT DOCUMENTS

2016/0036542 A1* 2/2016 Gong .................... H04W 24/10 370/329
2018/0367287 A1 12/2018 Chen et al.
2019/0356364 A1 11/2019 Maamari et al.

FOREIGN PATENT DOCUMENTS

CN      104105120 A      10/2014
CN      104284361 A       1/2015
(Continued)

OTHER PUBLICATIONS

International Search Report issued in corresponding International Application No. PCT/CN2020/132631, mailed Feb. 25, 2021, 4 pages.
(Continued)

*Primary Examiner* — Melvin C Marcelo
*Assistant Examiner* — Natali Pascual Peguero
(74) *Attorney, Agent, or Firm* — IPX PLLC

(57) ABSTRACT

A reference signal sending method and a transmitter are provided. The method includes: determining a time-frequency resource pattern of a target reference signal used for interference measurement, where the time-frequency resource pattern is used to indicate a time domain location and a frequency domain location of the target reference signal; and sending the target reference signal based on the time-frequency resource pattern.

20 Claims, 4 Drawing Sheets

(56) References Cited

FOREIGN PATENT DOCUMENTS

| | | |
|---|---|---|
| CN | 104782199 A | 7/2015 |
| CN | 108024364 A | 5/2018 |
| CN | 108282285 A | 7/2018 |
| CN | 108810956 A | 11/2018 |
| WO | 2014166455 A1 | 10/2014 |

OTHER PUBLICATIONS

CATT, "Discussion on additional IMR resource", TSG-RAN WG1 Meeting #89 R1-1707481, May 19, 2017.
First Office Action issued in related Chinese Application No. 201911236416.2, mailed Oct. 18, 2021, 7 pages.
Extended European Search Report issued in related European Application No. 20895691.2, mailed Dec. 1, 2022, 11 pages.

\* cited by examiner

REFERENCE SIGNAL SENDING METHOD AND TRANSMITTER

CROSS-REFERENCE TO RELATED APPLICATIONS

This application is a continuation of International Application No. PCT/CN2020/132631, filed Nov. 30, 2020, which claims priority to Chinese Patent Application No. 201911236416.2, filed Dec. 5, 2019. The entire contents of each of the above-referenced applications are expressly incorporated herein by reference.

TECHNICAL FIELD

The present disclosure relates to the field of communications technologies, and in particular, to a reference signal sending method and a transmitter.

BACKGROUND

Minimum Mean Square Error-Interference Rejection Combining (MMSE-IRC) signal processing is a practical receiver technology in a Multiple-Input Multiple-Output (MIMO) communications system. Generally, to achieve a desired effect, in Interference Rejection Combining (IRC), an interference covariance correlation matrix needs to be estimated by using a pilot, and it is assumed that an interference characteristic on a pilot symbol is consistent with an interference characteristic on a data symbol. In a Long Term Evolution (LTE) system, for a Physical Uplink Shared Channel (PUSCH), a pilot location needs to be fixed in a subframe, and pilot locations in all cells are the same. Therefore, for the LTE system, it is feasible to enable MMSE-IRC.

In a fifth-generation communications standard New Radio (NR), a Demodulation Reference Signal (DMRS) pilot symbol and a data symbol are flexibly designed. A pilot location on the data symbol is indicated by network signaling, and a pilot location of a neighboring cell may be inconsistent with a pilot location of a target cell. If it is also assumed that an estimated interference correlation matrix estimated on the pilot is consistent with interference on the data symbol, the performance of an MMSE-IRC receiver cannot be ensured.

In conclusion, resource allocation among multiple cells in the NR system is very flexible, so that a DMRS of the target cell is not interfered with by the neighboring cell, and a service data part of the target cell is interfered by a neighboring cell. In this case, a serious error exists in a result of interference measurement performed by using the DMRS, which cannot represent a case in which the service data part is interfered with by a real neighboring cell, and consequently receive performance is degraded.

SUMMARY

Embodiments of the present disclosure provide a reference signal sending method and a transmitter, to resolve a problem in the prior art that a serious error exists in a result of interference measurement performed only by using a DMRS, and a case in which a service data part is interfered with by a real neighboring cell cannot be represented.

To resolve the foregoing technical problem, the present disclosure is implemented as follows: A reference signal sending method is applied to a transmitter and includes:

determining a time-frequency resource pattern of a target reference signal used for interference measurement, where the time-frequency resource pattern is used to indicate a time domain location and a frequency domain location of the target reference signal; and sending the target reference signal by using zero power or non-zero power based on the time-frequency resource pattern.

An embodiment of the present disclosure further provides a transmitter, including:

a pattern determining module, configured to determine a time-frequency resource pattern of a target reference signal used for interference measurement, where the time-frequency resource pattern is used to indicate a time domain location and a frequency domain location of the target reference signal; and a sending module, configured to send the target reference signal by using zero power or non-zero power based on the time-frequency resource pattern.

An embodiment of the present disclosure further provides a communications device, including a processor, a memory, and a computer program that is stored in the memory and that can run on the processor, and when the computer program is executed by the processor, steps of the reference signal sending method are implemented.

An embodiment of the present disclosure provides a computer-readable storage medium, where the computer-readable storage medium stores a computer program, and when the computer program is executed by a processor, steps of the reference signal sending method are implemented.

In the embodiments of the present disclosure, a target reference signal used for interference measurement is provided, to resolve an interference measurement problem in an NR system. Further, by increasing time domain density of a time-frequency resource pattern of the target reference signal, a tracking range of neighboring cell interference is increased. By increasing the frequency domain density of the time-frequency resource pattern of the target reference signal, interference measurement accuracy is improved.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

In the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The terminal provided in the embodiments of the present disclosure may be a mobile phone, a tablet computer, a notebook computer, an Ultra-Mobile Personal Computer (UMPC), a netbook, a wearable device, a vehicle-mounted device, a Personal Digital Assistant (PDA), or the like. It should be noted that a specific type of the terminal is not limited in this embodiment of the present disclosure. In the embodiments of the present disclosure, an LTE system and an NR system are used as examples, but this system is not limited. The technical solution provided in the present disclosure may be applied to another system that has a same problem.

Figure 1:
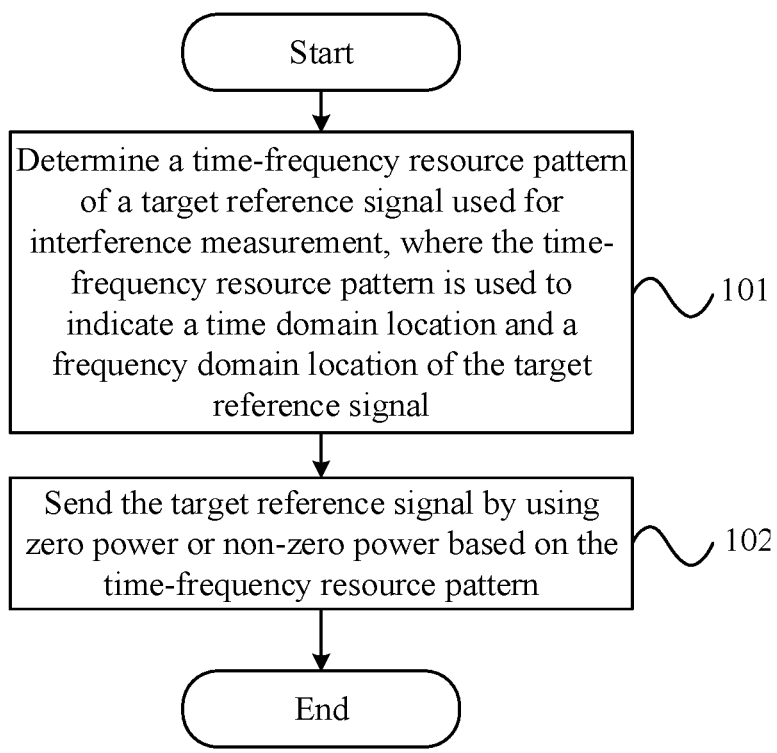
FIG. 1 is a schematic diagram of a step procedure of a reference signal sending method according to an embodiment of the present disclosure.

As shown in FIG. 1, an embodiment of the present disclosure provides a reference signal sending method, applied to a transmitter (the transmitter may be a transmitter of a terminal or a transmitter of a base station, which is not specifically limited herein), and including:

Step 101: Determine a time-frequency resource pattern of a target reference signal used for interference measurement, where the time-frequency resource pattern is used to indicate a time domain location and a frequency domain location of the target reference signal.

Step 102: Send the target reference signal by using zero power or non-zero power based on the time-frequency resource pattern.

An interference correlation matrix measured on the target reference signal is used to represent an interference correlation matrix on a current symbol.

This embodiment of the present disclosure proposes a method for inserting some pilots into a symbol occupied by a data signal, to measure interference, instead of merely relying on an DMRS in an NR system to perform interference measurement.

In some embodiments, overheads of the target reference signal in a time domain dimension and a frequency domain dimension need to be minimized while performance is ensured. To avoid a case that neighboring cell interference measured on the target reference signal is inconsistent with a neighboring cell interference characteristic to which the data signal is subjected, distribution of the target reference signal in time domain should be sufficiently dense (that is, a quantity of symbols occupied by the target reference signal in time domain is greater than or equal to a threshold, or a quantity of symbols spaced apart in time domain of the target reference signal is less than or equal to a threshold, and the threshold is related to neighboring cell data scheduling), so that regardless of a quantity of Orthogonal Frequency Division Multiplexing (OFDM) symbols occupied by interference transmitted from a neighboring cell to a target cell, it can be ensured that the target reference signal or a DMRS exists in an OFDM symbol area interfered by the neighboring cell.

In some embodiments, the method further includes:

avoiding the target reference signal by performing rate matching or puncturing on a data signal on a symbol on which the target reference signal is configured.

Further, in a case that the target reference signal is sent by using zero power (for example, the transmitter is a transmitter of a terminal), the method further includes:

performing power compensation on a symbol on which the target reference signal is configured.

When the target reference signal is sent by using zero power, the transmitter does not send another signal at a corresponding location of the target reference signal, and the data signal on the symbol avoids the target reference signal through rate matching or puncturing. Further, when the transmitter is a terminal, because the target reference signal is configured on some OFDM symbols, and the target reference signal is not configured on some other OFDM symbols, transmit power between different symbols is different. Therefore, to ensure that data signals have the same transmit signal power, the terminal needs to perform power compensation on the OFDM symbol on which the target reference signal is configured.

In some embodiments, the performing power compensation on a symbol on which the target reference signal is configured in step 103 includes:

performing, by using a compensation factor β, power compensation on the symbol on which the target reference signal is configured, where the compensation factor is $$\beta = \sqrt{\frac{sum\_RE}{sum\_RE - sum\_IMRS}};$$

and sum_RE represents a total quantity of resource elements REs in a resource allocated to the symbol, and sum_IMRS represents a quantity of REs occupied by the target reference signal on the symbol.

It should be noted that, in this embodiment of the present disclosure, a pilot signal used for another measurement purpose may also be sent on the OFDM symbol on which the target reference signal is located. In this case, power compensation may not be performed, which is not specifically limited herein.

In this embodiment of the present disclosure, the time-frequency resource pattern of the target reference signal in step 101 is mainly determined in two manners. In a first manner, the transmitter performs determining based on a predefined rule. In a second manner (the transmitter is a transmitter of the terminal), a network side device is configured for the terminal, and the terminal performs determining based on an indication of the network side device.

Specifically, in the first manner, step 101 includes:
determining the time-frequency resource pattern of the target reference signal based on reference information, where the reference information includes at least one of the following:
a modulation and coding scheme MCS of current service channel transmission;
a precoding frequency domain granularity of current service channel transmission;
a type of a demodulation reference signal DMRS;
whether the DMRS and data are frequency division multiple access;
a symbol length occupied by the DMRS;
a quantity of symbols occupied by the DMRS;
a symbol location occupied by the DMRS;
a quantity of symbols occupied by the data;
a quantity of symbols included in a current service channel;
a location of a symbol included in the current service channel;
an identifier of a cell in which a terminal is located;
a terminal identifier; and
a control resource set index (that is, CORESET pool index, which is used to indicate different transmit/receive nodes TRP).

For example, a time domain location of the time-frequency resource pattern may be related to an MCS transmitted on a current service channel, a type of a DMRS, a length of a symbol occupied by the DMRS, a quantity of symbols occupied by the DMRS, a location of the symbol occupied by the DMRS, a quantity of symbols occupied by data, a quantity of symbols included in the current service channel, and a location of the symbol included in the current service channel. The frequency domain location of the time-frequency resource pattern may be related to a modulation and coding scheme MCS for current traffic channel transmission and a precoding frequency domain granularity for current traffic channel transmission.

To accurately measure neighboring cell interference, the frequency domain location and the time domain location of the time-frequency resource pattern of the target reference signal are further related to a cell ID. For example, for different cells, time-frequency resource patterns of target reference signals have different offsets on frequency domain resources, or have different offsets on time domain resources.

In some embodiments, in the first manner, before the determining a time-frequency resource pattern of a target reference signal based on reference information, the method further includes:
receiving first indication information, where the first indication information is used to indicate whether the terminal activates the time-frequency resource pattern of the target reference signal.

Specifically, whether to activate the time-frequency resource pattern of the target reference signal may be configured by using RRC signaling (the RRC signaling carries the first indication information). For example, enable means "activate", and disable means "not activate". Specifically, the network side device may further separately notify, by using the RRC signaling, an uplink or a downlink whether the time-frequency resource pattern of the target reference signal is activated, which is not specifically limited herein.

Specifically, in the second manner, step 101 includes:
receiving second indication information, where the second indication information is used to indicate at least one time-frequency resource pattern of the target reference signal; and
receiving third indication information, and determining the time-frequency resource pattern of the target reference signal based on the third indication information, where the third indication information is used to indicate one time-frequency resource pattern in the at least one time-frequency resource pattern.

In some embodiments, the second indication information is carried by using radio resource control (RRC) signaling; and/or
the third indication information is carried by using a media access control control element (MAC CE) or downlink control information (DCI).

For example, multiple time-frequency resource patterns are pre-configured by using the RRC signaling, and one of the time-frequency resource patterns is activated by using the MAC CE or the DCI and indicated to the terminal. It should be noted that the DCI indication may be notified, in a manner of group common DCI, to one group of terminals or multiple groups of terminals to use a corresponding IMRS pattern.

In one embodiment, the time domain location of the time-frequency resource pattern is indicated by using a bitmap. For example, a 14-bit bitmap is used to indicate OFDM symbols on which the target reference signal is distributed, 1 indicates that the target reference signal occupies a corresponding OFDM symbol, and 0 indicates that there is no target reference signal.

The frequency domain location of the time-frequency resource pattern is indicated by using a bitmap. For example, a 12-bit bitmap is used to indicate subcarriers on which the target reference signal is distributed, 1 indicates that the target reference signal occupies a corresponding subcarrier, and 0 indicates that there is no target reference signal.

It should be noted that the bitmap indicating the time domain location and the frequency domain location may be pre-configured by using RRC signaling.

In another embodiment, the time domain location of the time-frequency resource pattern is indicated by a pre-configured time domain start location and time domain density. For example, a time domain start location may be pre-configured by using RRC signaling, or may be related to a location of a start symbol of a service channel.

The frequency domain location of the time-frequency resource pattern is indicated by a pre-configured frequency domain start location and frequency domain density. For example, the frequency domain start location may be configured by using RRC signaling, or may be related to a terminal ID or a cell ID.

It should be noted that the time domain density and/or the frequency domain density may be pre-configured by using RRC, or may be predefined, which is not specifically limited herein.

In still another embodiment, the method further includes:
in a case that the target reference signal collides with a pre-configured demodulation reference signal DMRS on a target symbol, sending the DMRS on the target symbol and ignoring the target reference signal. In other words, the target reference signal collides with the DMRS, sending of the target reference signal cannot affect sending of the DMRS.

In another embodiment, when the transmitter receives two or more service channels in one slot, respective time-frequency resource patterns are independently configured for different service channels. Different traffic channels (PDSCH or PUSCH) use a same time-frequency resource pattern or different time-frequency resource patterns.

Alternatively, in a case that the transmitter is a terminal, when the terminal is in a multi-transmit/receive point (Multi-TRP) scenario, respective time-frequency resource patterns are independently configured for communication links between different sending and receiving nodes and the terminal. A same time-frequency resource pattern or different time-frequency resource patterns are used for the communication links between different sending and receiving nodes and the terminal. When different time-frequency resource patterns are configured for different sending and receiving nodes, the corresponding time-frequency resource patterns may be related to control resource set indexes (different sending and receiving nodes correspond to different control resource set indexes).

It should be noted that the target reference signal provided in this embodiment of the present disclosure may be a newly introduced interference measurement reference signal, which may be referred to as an Interference Measurement Reference Signal (IMRS); or may be an existing DMRS or a phase tracking reference signal PTRS, which is not specifically limited herein.

Example

It is assumed that data of a target cell occupies seven OFDM symbols, and a mapping manner of TypeA (type A) is used, where the DMRS is located in a third OFDM symbol, and interference transmitted by a neighboring cell to the target cell is three or four OFDM symbols, and a mapping manner of TypeB (type B) is used, where the DMRS is located in a first OFDM symbol.

Figure 2:
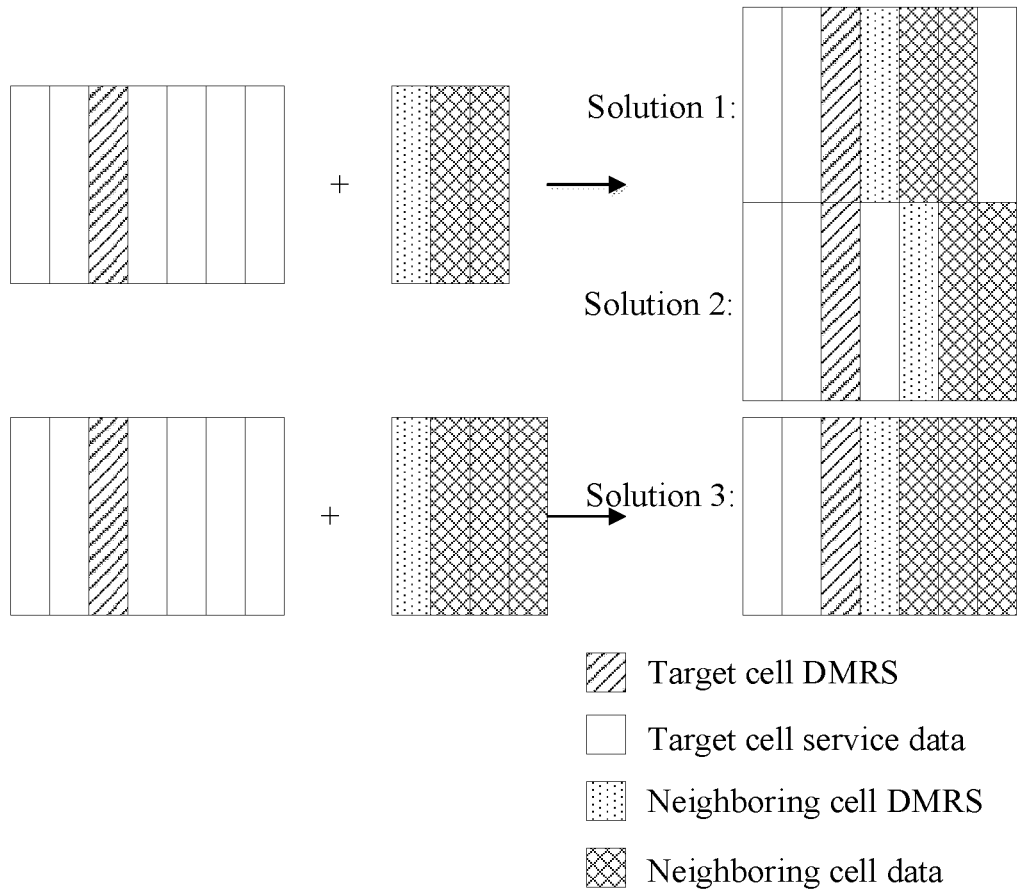
FIG. 2 is a schematic diagram of interference between a local cell and a neighboring cell in an example according to an embodiment of the present disclosure.

In this case, if neighboring cell interference overlaps with the first three symbols of the last four OFDM symbols of data of the target cell (the solution 1 as shown in FIG. 2), or overlaps with the last three OFDM symbols (the solution 2 as shown in FIG. 2), or overlaps with all the four OFDM symbols of data of the current cell (the solution 3 as shown in FIG. 2), accurate interference measurement cannot be performed by using the DMRS in the third OFDM symbol of the data of the target cell, that is, a case in which the DMRS is not interfered by the neighboring cell occurs, but a service data part is interfered by the neighboring cell, resulting in inconsistent interference characteristics. In this case, an MMSE-IRC receiver will not work effectively.

Figure 3:
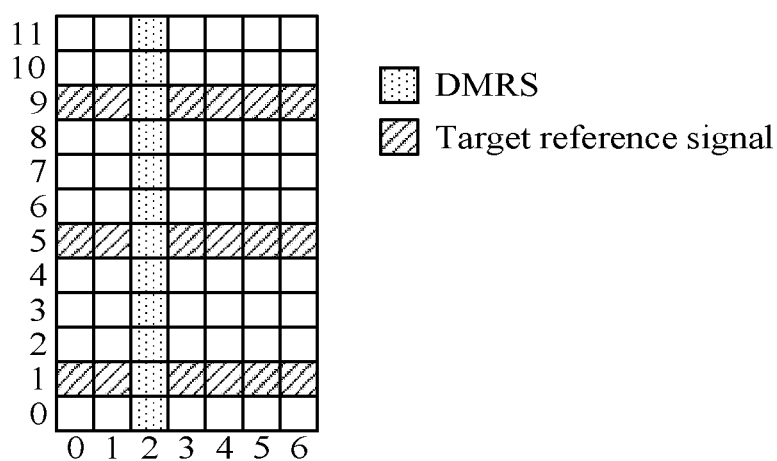
FIG. 3 shows a time-frequency resource pattern of a target reference signal in an example according to an embodiment of the present disclosure.
Figure 4:
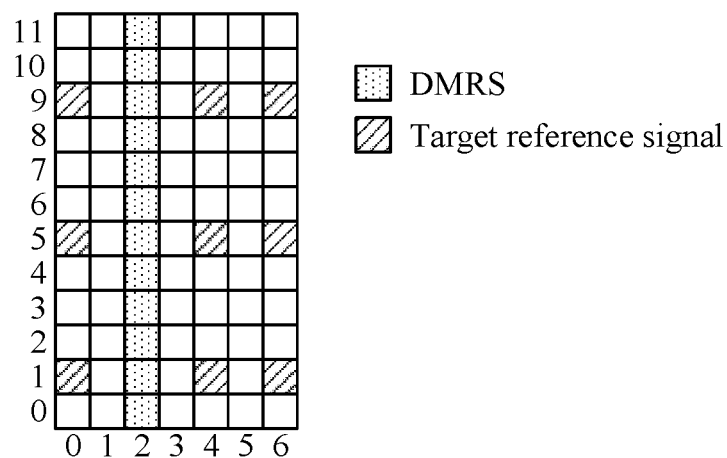
FIG. 4 shows another time-frequency resource pattern of a target reference signal in an example according to an embodiment of the present disclosure.

FIG. 3 and FIG. 4 are schematic diagrams of the time domain location and the frequency domain location of the target reference signal. The target reference signal shown in FIG. 3 is distributed on each OFDM symbol in time domain (when colliding with the DMRS, the target reference signal is not placed), and frequency domain density is 3; in other words, one target reference signal is placed on every four subcarriers, and a placement location in frequency domain may be offset according to a configuration offset of a higher layer, for example, an offset of one subcarrier is performed in FIG. 3. One target reference signal shown in FIG. 4 is placed in every two OFDM symbols in time domain. When colliding with the DMRS, the target reference signal is not placed. Configuration of a remaining parameter is similar to FIG. 3, and frequency domain density is 3, and a placement location in frequency domain may be offset according to a configuration offset of a higher layer, for example, an offset of one subcarrier is performed in FIG. 4. Compared with the time-frequency resource pattern of the target reference signal in FIG. 3, reference signal overheads of the time-frequency resource pattern of the target reference signal in FIG. 4 are less, but performance of interference estimation may be poorer than that of the time-frequency resource pattern in FIG. 3.

In conclusion, the time domain density of the time-frequency resource pattern of the target reference signal is increased, so that a tracking range of neighboring cell interference can be increased; and frequency domain density of the time-frequency resource pattern of the target reference signal is increased, so that interference measurement accuracy is improved.

The foregoing two types of time-frequency resource patterns can ensure that the target reference signal definitely exists in an OFDM symbol area interfered with by the neighboring cell. Therefore, the two types of time-frequency resource patterns may be used for effective measurement of neighboring cell interference, and a problem that interference cannot be correctly measured in an NR system is resolved.

In conclusion, a flexible resource allocation design is used in the NR system. However, while pursuing flexibility, the uncertainty of intra-system interference is increased. An embodiment of the present disclosure provides a target reference signal used for interference measurement, to resolve an interference measurement problem in the NR system.

Figure 5:
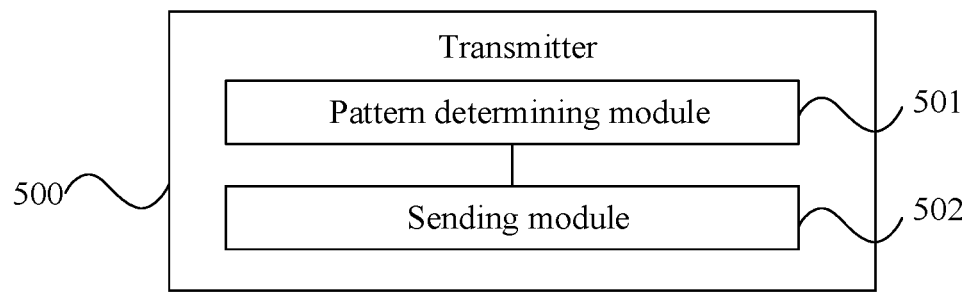
FIG. 5 is a schematic diagram of a structure of a transmitter according to an embodiment of the present disclosure.

As shown in FIG. 5, an embodiment of the present disclosure further provides a transmitter 500, including:
  a pattern determining module 501, configured to determine a time-frequency resource pattern of a target reference signal used for interference measurement, where the time-frequency resource pattern is used to indicate a time domain location and a frequency domain location of the target reference signal; and
  a sending module 502, configured to send the target reference signal by using zero power or non-zero power based on the time-frequency resource pattern.

In some embodiments, in the foregoing embodiment of the present disclosure, the transmitter further includes:
  a first processing module, configured to avoid the target reference signal by performing rate matching or puncturing on a data signal on a symbol on which the target reference signal is configured.

In some embodiments, in the foregoing embodiment of the present disclosure, the transmitter further includes:
  a second processing module, configured to: in a case that the target reference signal is sent by using zero power, perform power compensation on a symbol on which the target reference signal is configured.

In some embodiments, in the foregoing embodiment of the present disclosure, the processing module includes:
  a processing sub-module, configured to perform, by using a compensation factor $\beta$, power compensation on the symbol on which the target reference signal is configured, where the compensation factor is $$\beta = \sqrt{\frac{sum\_RE}{sum\_RE - sum\_IMRS}};$$

and
sum_RE represents a total quantity of resource elements REs in a resource allocated to the symbol, and sum_IMRS represents a quantity of REs occupied by the target reference signal on the symbol.

In some embodiments, in the foregoing embodiment of the present disclosure, the pattern determining module includes:
   a first pattern determining sub-module, configured to determine the time-frequency resource pattern of the target reference signal based on reference information, where the reference information includes at least one of the following:
   a modulation and coding scheme MCS of current service channel transmission;
   a precoding frequency domain granularity of current service channel transmission;
   a type of a demodulation reference signal DMRS;
   whether the DMRS and data are frequency division multiple access;
   a symbol length occupied by the DMRS;
   a quantity of symbols occupied by the DMRS;
   a symbol location occupied by the DMRS;
   a quantity of symbols occupied by the data;
   a quantity of symbols included in a current service channel;
   a location of a symbol included in the current service channel;
   an identifier of a cell in which a terminal is located;
   a terminal identifier; and
   a control resource set index.

In some embodiments, in the foregoing embodiment of the present disclosure, the transmitter further includes:
   a first receiving module, configured to receive first indication information, where the first indication information is used to indicate whether the terminal activates the time-frequency resource pattern of the target reference signal.

In some embodiments, in the foregoing embodiment of the present disclosure, the pattern determining module includes:
   a second pattern determining sub-module, configured to receive second indication information, where the second indication information is used to indicate at least one time-frequency resource pattern of the target reference signal; and
   a third pattern determining sub-module, configured to receive third indication information, and determine the time-frequency resource pattern of the target reference signal based on the third indication information, where the third indication information is used to indicate one time-frequency resource pattern in the at least one time-frequency resource pattern.

In some embodiments, in the foregoing embodiment of the present disclosure, the second indication information is carried by using radio resource control RRC signaling; and/or
   the third indication information is carried by using a media access control control element (MAC CE) or downlink control information.

In some embodiments, in the foregoing embodiment of the present disclosure, a time domain location of the time-frequency resource pattern is indicated by using a bitmap; or a time domain location of the time-frequency resource pattern is indicated by a pre-configured time domain start location and time domain density.

In some embodiments, in the foregoing embodiment of the present disclosure, a frequency domain location of the time-frequency resource pattern is indicated by using a bitmap; or a frequency domain location of the time-frequency resource pattern is indicated by a pre-configured frequency domain start location and frequency domain density.

In some embodiments, in the foregoing embodiment of the present disclosure, the transmitter further includes:
   a collision module, configured to: in a case that the target reference signal collides with a pre-configured demodulation reference signal (DMRS) on a target symbol, send the DMRS on the target symbol and ignoring the target reference signal.

In some embodiments, in the foregoing embodiment of the present disclosure,
   when the transmitter receives two or more service channels in one slot, respective time-frequency resource patterns are independently configured for different service channels;
   or
   in a case that the transmitter is a terminal, when the terminal is in a scenario of multiple sending and receiving nodes, respective time-frequency resource patterns are independently configured for communication links between different sending and receiving nodes and the terminal.

The transmitter provided in this embodiment of the present disclosure can implement processes implemented by the transmitter in the method embodiments of FIG. 1 to FIG. 4. To avoid repetition, details are not described herein again.

In conclusion, in the embodiments of the present disclosure, a target reference signal used for interference measurement is provided. By increasing time domain density of a time-frequency resource pattern of the target reference signal, a tracking range of neighboring cell interference is increased. By increasing frequency domain density of the time-frequency resource pattern of the target reference signal, interference measurement accuracy is improved. In this way, an interference measurement problem in an NR system is resolved.

It should be noted that the transmitter provided in this embodiment of the present disclosure is a transmitter that can perform the foregoing reference signal sending method. Therefore, all embodiments of the foregoing reference signal sending method are applicable to the transmitter, and a same or similar beneficial effect can be achieved.

Figure 6:
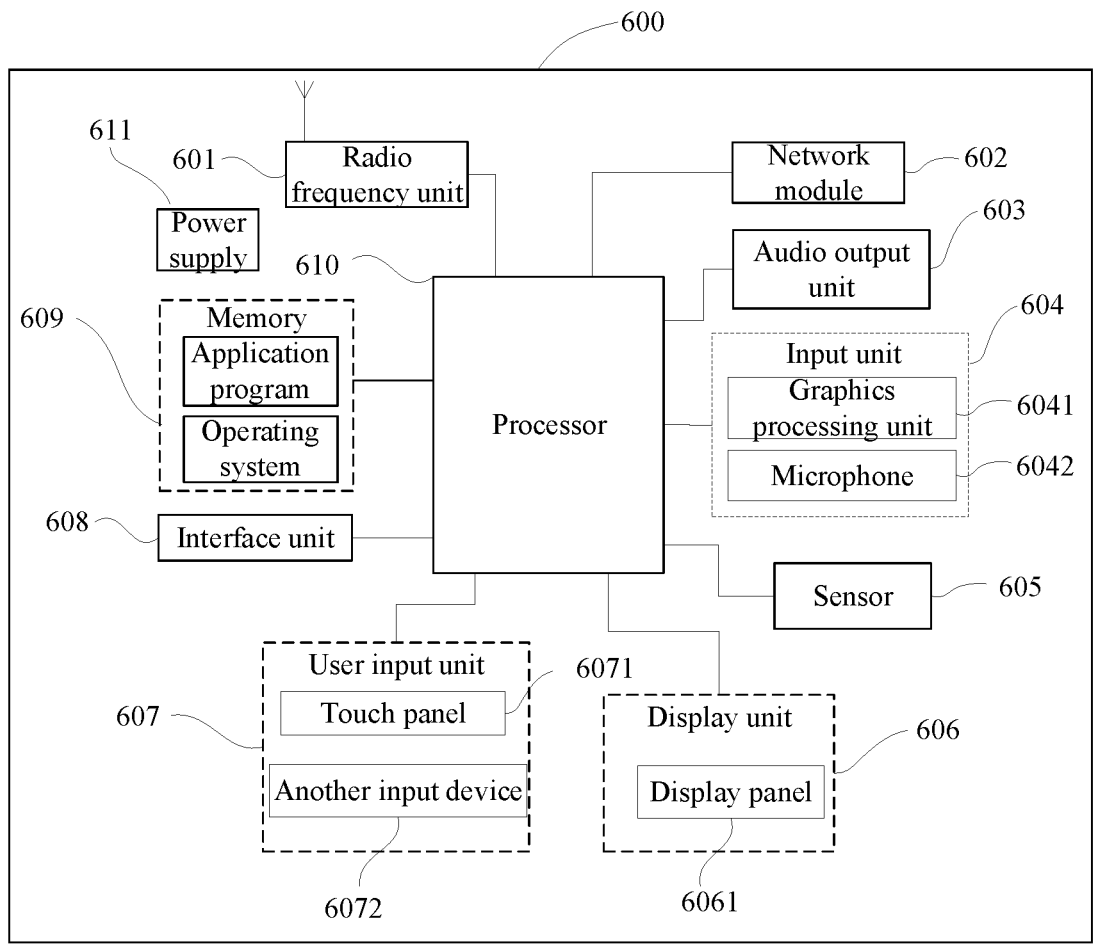
FIG. 6 is a schematic diagram of a structure of a terminal according to an embodiment of the present disclosure.

In a case that the transmitter is a transmitter of a terminal, FIG. 6 is a schematic diagram of a hardware structure of a terminal for implementing the embodiments of the present disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that a structure of the terminal shown in FIG. 6 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 610 is configured to determine a time-frequency resource pattern of a target reference signal used for interference measurement, where the time-frequency resource pattern is used to indicate a time domain location and a frequency domain location of the target reference signal.

The radio frequency unit 601 is configured to send the target reference signal by using zero power or non-zero power based on the time-frequency resource pattern.

In conclusion, in the embodiments of the present disclosure, a target reference signal used for interference measurement is provided. By increasing time domain density of a time-frequency resource pattern of the target reference signal, a tracking range of neighboring cell interference is increased. By increasing the frequency domain density of the time-frequency resource pattern of the target reference signal, interference measurement accuracy is improved. In this way, an interference measurement problem in an NR system is resolved.

It should be noted that the terminal provided in this embodiment of the present disclosure is a terminal that can perform the foregoing reference signal sending method. Therefore, all embodiments of the foregoing reference signal sending method are applicable to the terminal, and a same or similar beneficial effect can be achieved.

It should be understood that, in this embodiment of the present disclosure, the radio frequency unit 601 may be configured to receive and send information or receive and send a signal in a call process. Specifically, after downlink data from a base station is received, the processor 610 processes the downlink data. In addition, uplink data is sent to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device by using a wireless communication system.

The terminal provides wireless broadband Internet access for a user by using a network module 602, for example, helping the user send and receive an email, browsing a web page, and accessing streaming media.

The audio output unit 603 may convert audio data received by the radio frequency unit 601 or the network module 602 or stored in the memory 609 into an audio signal and output as sound. In addition, the audio output unit 603 may further provide audio output (for example, call signal receiving sound or message receiving sound) related to a specific function performed by the terminal 600. The audio output unit 603 includes a loudspeaker, a buzzer, a telephone receiver, and the like.

The input unit 604 is configured to receive an audio or time frequency signal. The input unit 604 may include a Graphics Processing Unit (GPU) 6041 and a microphone 6042. The graphics processing unit 6041 processes image data of a static picture or a video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive sound and can process such sound into audio data. The processed audio data may be output by being converted into a format that may be sent to a mobile communications base station by using the radio frequency unit 601 in a telephone call mode.

The terminal 600 further includes at least one sensor 605, such as an optical sensor, a motion sensor, and another sensor. Specifically, the optical sensor includes an ambient light sensor and a proximity sensor. The ambient light sensor may adjust the luminance of the display panel 6061 based on the brightness of ambient light, and the proximity sensor may disable the display panel 6061 and/or backlight when the terminal 600 approaches an ear. As a type of motion sensor, an accelerometer sensor may detect the magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 605 may further include a fingerprint sensor, a pressure sensor, an iris sensor, a molecular sensor, a gyroscope, a barometer, a hygrometer, a thermometer, an infrared sensor, and the like. This is not described herein.

The display unit 606 is configured to display information entered by the user or information provided for the user. The display unit 606 may include a display panel 6061, and the display panel 6061 may be configured in a form of a Liquid Crystal Display (LCD), an Organic Light-Emitting Diode (OLED), or the like.

The user input unit 607 may be configured to receive input digit or character information and generate key signal input related to user setting and function control of a terminal. Specifically, the user input unit 607 includes a touch panel 6071 and another input device 6072. The touch panel 6071, also referred to as a touchscreen, may collect a touch operation performed by the user on or near the touch panel 6071 (for example, an operation performed by the user on or near the touch panel 6071 by using any suitable object or accessory such as a finger or a stylus). The touch panel 6071 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into contact coordinates, sends the contact coordinates to the processor 610, and can receive and execute a command sent by the processor 610. In addition, the touch panel 6071 may be implemented by using a plurality of types such as a resistive type, a capacitive type, an infrared ray, and a surface acoustic wave. The user input unit 607 may include another input device 6072 in addition to the touch panel 6071. Specifically, the another input device 6072 may include but is not limited to one or more of a physical keyboard, a function key (such as a volume control key or an on/off key), a trackball, a mouse, a joystick, and the like. Details are not described herein.

Further, the touch panel 6071 may cover the display panel 6061. After detecting the touch operation on or near the touch panel 6071, the touch panel 6061 transmits the touch operation to the processor 610 to determine a type of a touch event, and then the processor 610 provides corresponding visual output on the display panel 6061 based on the type of the touch event. In FIG. 6, the touch panel 6071 and the display panel 6061 are used as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headset port, an external power supply (or battery charger) port, a wired or wireless data port, a storage card port, a port configured to connect to an apparatus having an identification module, an audio input/output (I/O) port, a time frequency I/O port, a headset port, and the like. The interface unit 608 may be configured to receive input (for example, data information and power) from the external apparatus and transmit the received input to one or more elements in the terminal 600, or may be configured to transmit data between the terminal 600 and the external apparatus.

The memory 609 may be configured to store a software program and various data. The memory 609 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 609 may include a high-speed random access memory, and may further include a non-volatile memory such as at least one magnetic disk storage component, a flash memory component, or another volatile solid-state storage component.

The processor 610 is a control center of the terminal, and is connected to all parts of the entire terminal by using various interfaces and lines, and performs various functions of the terminal and processes data by running or executing the software program and/or the module that are stored in the memory 609 and invoking the data stored in the memory 609, to implement overall monitoring on the terminal. The processor 610 may include one or more processing units. Preferentially, the processor 610 may be integrated with an application processor and a modem processor. The application processor mainly processes an operating system, a user interface, an application program, and the like, and the modem processor mainly processes wireless communication. It may be understood that the modem processor may alternatively not be integrated into the processor 610.

The terminal 600 may further include a power supply 611 (such as a battery) that supplies power to each component. Preferentially, the power supply 611 may be logically connected to the processor 610 by using a power management system, to implement functions such as charging, discharging, and power consumption management by using the power management system.

In addition, the terminal 600 includes some function modules not shown, and details are not described herein.

Figure 7:
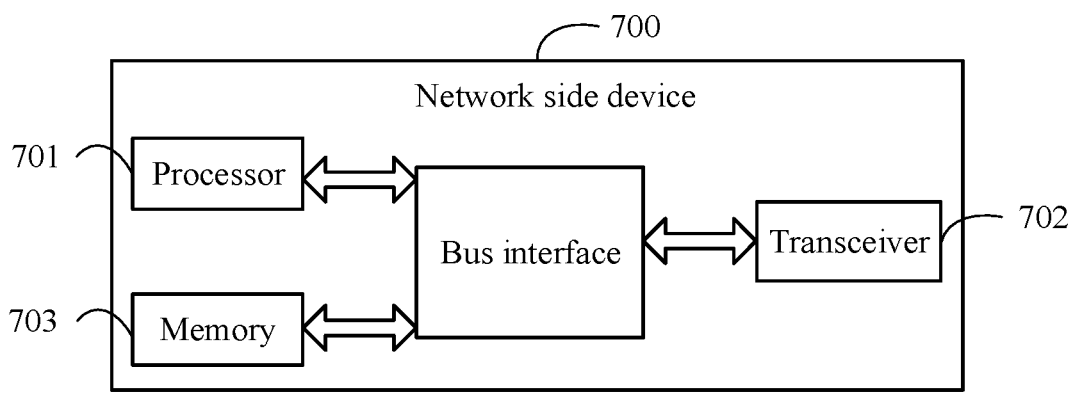
FIG. 7 is a schematic diagram of a structure of a network side device according to an embodiment of the present disclosure.

In a case that the transmitter is a transmitter of a network side device, FIG. 7 is a structural diagram of the network side device according to an embodiment of the present disclosure, which can implement details of the foregoing information sending method and achieve a same effect. As shown in FIG. 7, a network side device 700 includes a processor 701, a transceiver 702, a memory 703, and a bus interface.

The processor 701 is configured to read a program in the memory 703 and perform the following process:
determining a time-frequency resource pattern of a target reference signal used for interference measurement, where the time-frequency resource pattern is used to indicate a time domain location and a frequency domain location of the target reference signal; and
sending the target reference signal by using zero power or non-zero power based on the time-frequency resource pattern.

In conclusion, in the embodiments of the present disclosure, a target reference signal used for interference measurement is provided. By increasing time domain density of a time-frequency resource pattern of the target reference signal, a tracking range of neighboring cell interference is increased. By increasing frequency domain density of the time-frequency resource pattern of the target reference signal, interference measurement accuracy is improved. In this way, an interference measurement problem in an NR system is resolved.

It should be noted that the network side device provided in this embodiment of the present disclosure is a network side device that can perform the foregoing reference signal sending method. Therefore, all embodiments of the foregoing reference signal sending method are applicable to the network side device, and a same or similar beneficial effect can be achieved.

In FIG. 7, a bus architecture may include any quantity of interconnected buses and bridges, and is specifically linked by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides interfaces. The transceiver 702 may be multiple elements, in other words, includes a transmitter and a receiver, and provides a unit configured to communicate with various other apparatuses on a transmission medium.

An embodiment of the present disclosure further provides a communications device, and the communications device includes a transmitter. The communications device further includes a processor, a memory, and a computer program that is stored in the memory and that can run on the processor. When the computer program is executed by the processor, processes of the embodiment of the reference signal sending method are implemented, and a same technical effect can be achieved. To avoid repetition, details are not described herein.

An embodiment of the present disclosure further provides a computer-readable storage medium. A computer program is stored in the computer-readable storage medium. When being executed by a processor, processes of the embodiment of the reference signal sending method are implemented, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for reference signal sending, performed by a transmitter, comprising:
determining a time-frequency resource pattern of a target reference signal used for interference measurement, wherein the time-frequency resource pattern is used to indicate a time domain location and a frequency domain location of the target reference signal; and
sending the target reference signal by using zero power or non-zero power based on the time-frequency resource pattern,
wherein the target reference signal is located on a symbol occupied by a data signal.

2. The method according to claim 1, further comprising:
avoiding the target reference signal by performing rate matching or puncturing on the data signal on the symbol on which the target reference signal is configured.

3. The method according to claim 1, wherein in response to the target reference signal being sent by using zero power, the method further comprises:
performing power compensation on the symbol on which the target reference signal is configured.

4. The method according to claim 3, wherein the performing power compensation on the symbol on which the target reference signal is configured comprises:
performing, by using a compensation factor β, power compensation on the symbol on which the target reference signal is configured, wherein the compensation factor is $$\beta = \sqrt{\frac{sum\_RE}{sum\_RE - sum\_IMRS}};$$

and
sum_RE represents a total quantity of resource elements (REs) in a resource allocated to the symbol, and sum_IMRS represents a quantity of REs occupied by the target reference signal on the symbol.

5. The sending method according to claim 1, wherein the determining a time-frequency resource pattern of a target reference signal used for interference measurement comprises:
determining the time-frequency resource pattern of the target reference signal based on reference information, wherein the reference information comprises at least one of the following:
a modulation and coding scheme (MCS) of current service channel transmission;
a precoding frequency domain granularity of current service channel transmission;
a type of a demodulation reference signal (DMRS), wherein the DMRS and data are frequency division multiple access;
a symbol length occupied by the DMRS;
a quantity of symbols occupied by the DMRS;
a symbol location occupied by the DMRS;
a quantity of symbols occupied by the data;
a quantity of symbols comprised in a current service channel;
a location of a symbol comprised in the current service channel;
an identifier of a cell in which a terminal is located;
a terminal identifier; or
a control resource set index.

6. The method according to claim 5, wherein before the determining a time-frequency resource pattern of a target reference signal used for interference measurement, the method further comprises:
receiving first indication information, wherein the first indication information is used to indicate whether the terminal activates the time-frequency resource pattern of the target reference signal.

7. The method according to claim 1, wherein the determining a time-frequency resource pattern of a target reference signal used for interference measurement comprises:
receiving second indication information, wherein the second indication information is used to indicate at least one time-frequency resource pattern of the target reference signal; and
receiving third indication information and determining the time-frequency resource pattern of the target reference signal based on the third indication information, wherein the third indication information is used to indicate one time-frequency resource pattern in the at least one time-frequency resource pattern.

8. The method according to claim 7, further comprising:
carrying the second indication information by using radio resource control (RRC) signaling; or
carrying the third indication information by using a media access control control element (MAC CE) or downlink control information.

9. The method according to claim 7, further comprising:
using a bitmap to indicate a time domain location of the time-frequency resource pattern; or
using a pre-configured time domain start location and time domain density to indicate a time domain location of the time-frequency resource pattern.

10. The method according to claim 7, further comprising:
using a bitmap to indicate a frequency domain location of the time-frequency resource pattern; or
using a pre-configured time domain start location and time domain density to indicate a frequency domain location of the time-frequency resource pattern.

11. The method according to claim 1, further comprising:
in response to the target reference signal colliding with a pre-configured demodulation reference signal (DMRS) on a target symbol, sending the DMRS on the target symbol and ignoring the target reference signal.

12. The method according to claim 1,
wherein when the transmitter receives two or more service channels in one slot, respective time-frequency resource patterns are independently configured for different service channels; or in response to the transmitter being a terminal, when the terminal is in a scenario of multiple sending and receiving nodes, respective time-frequency resource patterns are independently configured for communication links between different sending and receiving nodes and the terminal.

13. A communication device, comprising: a memory storing a computer program; and a processor coupled to the memory and configured to execute the computer program to perform a method according to claim 1.

14. A transmitter, comprising:
a pattern determining module, configured to determine a time-frequency resource pattern of a target reference signal used for interference measurement, wherein the time-frequency resource pattern is used to indicate a time domain location and a frequency domain location of the target reference signal; and a sending module, configured to send the target reference signal by using zero power or non-zero power based on the time-frequency resource pattern, wherein the target reference signal is located on a symbol occupied by a data signal.

15. The transmitter according to claim 14, further comprising:
a first processing module, configured to avoid the target reference signal by performing rate matching or puncturing on the data signal on the symbol on which the target reference signal is configured.

16. The transmitter according to claim 14, further comprising:
a second processing module, configured to: in response to the target reference signal being sent by using zero power, perform power compensation on the symbol on which the target reference signal is configured.

17. The transmitter according to claim 14, further comprising:

a processing sub-module, configured to perform, by using a compensation factor $\beta$, power compensation on the symbol on which the target reference signal is configured, wherein the compensation factor is $\beta = \sqrt{sum\_RE/sum\_RE - sum\_IMRS}$; and sum_RE represents a total quantity of resource elements (REs) in a resource allocated to the symbol, and sum_IMRS represents a quantity of REs occupied by the target reference signal on the symbol.

18. The transmitter according to claim 14,
wherein when the transmitter receives two or more service channels in one slot, respective time-frequency resource patterns are independently configured for different service channels; or in response to the transmitter being a terminal, when the terminal is in a scenario of multiple sending and receiving nodes, respective time-frequency resource patterns are independently configured for communication links between different sending and receiving nodes and the terminal.

19. A non-transitory computer-readable storage medium, storing a computer program, when the computer program is executed by a processor, performs a method for reference signal sending, the method comprising: determining a time-frequency resource pattern of a target reference signal used for interference measurement, wherein the time-frequency resource pattern is used to indicate a time domain location and a frequency domain location of the target reference signal; and sending the target reference signal by using zero power or non-zero power based on the time-frequency resource pattern, wherein the target reference signal is located on a symbol occupied by a data signal.

20. The non-transitory computer-readable storage medium according to claim 19, the method further comprising:

avoiding the target reference signal by performing rate matching or puncturing on the data signal on the symbol on which the target reference signal is configured.

* * * * *